(12) United States Patent
Beenau et al.

(10) Patent No.: US 9,866,989 B2
(45) Date of Patent: Jan. 9, 2018

(54) PAYMENT APPLICATION DOWNLOAD TO MOBILE PHONE AND PHONE PERSONALIZATION

(71) Applicant: III Holdings 1, LLC, Wilmington, DE (US)

(72) Inventors: Blayn W. Beenau, Peoria, AZ (US); Jessica U. Warren, West Sussex (GB); Lee J. Peart, Surrey (GB); Peter D. Saunders, Salt Lake City, UT (US)

(73) Assignee: III Holdings 1, LLC, Wilmington, DE (US)

( * ) Notice: Subject to any disclaimer, the term of this patent is extended or adjusted under 35 U.S.C. 154(b) by 0 days.

(21) Appl. No.: 15/090,603

(22) Filed: Apr. 4, 2016

(65) Prior Publication Data

US 2017/0006406 A1 Jan. 5, 2017

Related U.S. Application Data

(63) Continuation of application No. 14/086,080, filed on Nov. 21, 2013, now Pat. No. 9,307,341, which is a continuation of application No. 11/741,288, filed on Apr. 27, 2007, now Pat. No. 8,620,260.

(51) Int. Cl.
| | | |
|---|---|---|
| *H04W 4/00* | (2009.01) | |
| *G06Q 20/32* | (2012.01) | |
| *G06Q 20/34* | (2012.01) | |
| *G07F 7/10* | (2006.01) | |

(52) U.S. Cl.
CPC ............ *H04W 4/003* (2013.01); *G06Q 20/32* (2013.01); *G06Q 20/3221* (2013.01); *G06Q 20/3227* (2013.01); *G06Q 20/3552* (2013.01); *G07F 7/1008* (2013.01)

(58) Field of Classification Search
CPC ... H04W 4/003; G06Q 20/3221; G06Q 20/32; G06Q 20/3552; G06Q 20/3227
USPC ......... 455/406; 705/39, 1.1, 26.1, 30, 14.38, 705/14.64, 16, 21, 348; 235/472.02
See application file for complete search history.

(56) References Cited

U.S. PATENT DOCUMENTS

| | | |
|---|---|---|
| 5,796,832 A | 8/1998 | Kawan |
| 5,949,044 A | 9/1999 | Walker et al. |
| 5,991,749 A | 11/1999 | Morrill, Jr. |

(Continued)

FOREIGN PATENT DOCUMENTS

| | | |
|---|---|---|
| EP | 1280115 | 1/2003 |
| WO | 9834203 | 8/1998 |

(Continued)

OTHER PUBLICATIONS

Examination Report in European Application No. 08746400.4 dated May 27, 2013, 4 pages.

(Continued)

*Primary Examiner* — Inder Mehra
(74) *Attorney, Agent, or Firm* — Meyertons, Hood, Kivlin, Kowert & Goetzel, P.C.

(57) ABSTRACT

A method and system of personalizing a mobile phone over a wireless network is provided. The method is fast, reliable, and eliminates the need for an uninterrupted online connection to a host server in order to achieve successful download of user information. With the method and system, a mobile phone can be personalized for various purposes, such as for conducting financial transactions.

17 Claims, 4 Drawing Sheets

(56) References Cited

U.S. PATENT DOCUMENTS

| | | | |
|---|---|---|---|
| 5,999,596 A | 12/1999 | Walker et al. | |
| 6,026,166 A | 2/2000 | LeBourgeois | |
| 6,029,151 A | 2/2000 | Nikander | |
| 6,102,287 A | 8/2000 | Matyas, Jr. | |
| 6,169,890 B1 | 1/2001 | Vatanen | |
| 6,227,447 B1 | 5/2001 | Campisano | |
| 6,267,292 B1 | 7/2001 | Walker et al. | |
| 6,311,167 B1 | 10/2001 | Davis et al. | |
| 6,327,348 B1 | 12/2001 | Walker et al. | |
| 6,366,893 B2 | 4/2002 | Hannula et al. | |
| 6,442,532 B1 | 8/2002 | Kawan | |
| 6,456,984 B1 | 9/2002 | Demoff et al. | |
| 6,481,632 B2 | 11/2002 | Wentker et al. | |
| 6,597,770 B2 | 7/2003 | Walker et al. | |
| 6,764,003 B1 | 7/2004 | Martschitsch et al. | |
| 6,807,410 B1 | 10/2004 | Pailles et al. | |
| 6,868,391 B1 | 3/2005 | Hultgren | |
| 6,873,974 B1 | 3/2005 | Schutzer | |
| 6,941,270 B1 | 9/2005 | Hannula | |
| 6,988,657 B1 | 1/2006 | Singer et al. | |
| 7,003,493 B2 | 2/2006 | Weichert et al. | |
| 7,014,107 B2 | 3/2006 | Singer et al. | |
| 7,014,109 B2 | 3/2006 | Hjelmvik | |
| 7,031,939 B1 | 4/2006 | Gallagher et al. | |
| 7,054,835 B2 | 5/2006 | Nanbu et al. | |
| 7,089,208 B1 | 8/2006 | Levchin et al. | |
| 7,096,003 B2 | 8/2006 | Joao et al. | |
| 7,099,850 B1 | 8/2006 | Mann, II et al. | |
| 7,103,576 B2 | 9/2006 | Mann, II et al. | |
| 7,107,078 B2 | 9/2006 | Lehto | |
| 7,107,250 B2 | 9/2006 | Harrison | |
| 7,120,608 B1 | 10/2006 | Gallagher et al. | |
| 7,124,937 B2 | 10/2006 | Myers et al. | |
| 7,131,571 B2 | 11/2006 | Swift et al. | |
| 7,136,836 B1 | 11/2006 | Washizuka et al. | |
| 7,139,694 B2 | 11/2006 | Horn et al. | |
| 7,146,342 B1 | 12/2006 | Angelin et al. | |
| 7,152,782 B2 | 12/2006 | Shenker et al. | |
| 7,239,226 B2 | 7/2007 | Berardi et al. | |
| 7,249,112 B2 | 7/2007 | Berardi et al. | |
| 7,389,531 B2 | 6/2008 | Fransdonk | |
| 8,489,067 B2 | 7/2013 | Rackley, III et al. | |
| 8,620,260 B2 | 12/2013 | Beenau et al. | |
| 2001/0037264 A1 | 11/2001 | Husemann et al. | |
| 2002/0004770 A1 | 1/2002 | Phillips et al. | |
| 2003/0022655 A1 | 1/2003 | Bogat | |
| 2003/0055785 A1 | 3/2003 | Lahiri | |
| 2003/0074328 A1 | 4/2003 | Schiff et al. | |
| 2003/0112783 A1 | 6/2003 | Rankin | |
| 2004/0006693 A1* | 1/2004 | Vasnani | H04L 63/0807 713/168 |
| 2004/0025060 A1* | 2/2004 | Raffaele | G06F 9/468 726/30 |
| 2004/0030652 A1 | 2/2004 | Grunzig et al. | |
| 2004/0185830 A1 | 9/2004 | Joao et al. | |
| 2005/0038736 A1 | 2/2005 | Saunders | |
| 2005/0049974 A1 | 3/2005 | Jani et al. | |
| 2005/0187873 A1* | 8/2005 | Labrou | G06Q 20/02 705/40 |
| 2005/0187882 A1 | 8/2005 | Sovio et al. | |
| 2005/0246181 A1 | 11/2005 | Kawahara | |
| 2006/0018450 A1 | 1/2006 | Sandberg-Diment | |
| 2006/0020550 A1 | 1/2006 | Fields et al. | |
| 2006/0080232 A1 | 4/2006 | Epps | |
| 2006/0112167 A1 | 5/2006 | Steele et al. | |
| 2006/0122921 A1 | 6/2006 | Comerford et al. | |
| 2006/0144932 A1 | 7/2006 | Bendeck et al. | |
| 2006/0163349 A1 | 7/2006 | Neugebauer | |
| 2006/0168095 A1* | 7/2006 | Sharma | G06F 17/30905 709/217 |
| 2006/0235758 A1 | 10/2006 | Schleicher | |
| 2006/0258397 A1 | 11/2006 | Kaplan et al. | |
| 2006/0259982 A1 | 11/2006 | Upendran | |
| 2006/0278704 A1 | 12/2006 | Saunders et al. | |
| 2006/0287004 A1 | 12/2006 | Fuqua | |
| 2007/0001001 A1 | 1/2007 | Myers et al. | |
| 2007/0011099 A1 | 1/2007 | Sheehan | |
| 2007/0095927 A1 | 5/2007 | Pesonen | |
| 2007/0106558 A1 | 5/2007 | Mitchell et al. | |
| 2007/0118535 A1* | 5/2007 | Schwesig | G11B 27/031 |
| 2007/0130025 A1 | 6/2007 | Nakajima | |
| 2007/0187491 A1 | 8/2007 | Godwin et al. | |
| 2007/0192245 A1 | 8/2007 | Fisher et al. | |
| 2007/0215696 A1 | 9/2007 | Macnish | |
| 2007/0226051 A1 | 9/2007 | Addepalli et al. | |
| 2007/0233615 A1 | 10/2007 | Tumminaro | |
| 2007/0255652 A1 | 11/2007 | Tumminaro et al. | |
| 2007/0255653 A1 | 11/2007 | Tumminaro et al. | |
| 2007/0262134 A1 | 11/2007 | Humphrey et al. | |
| 2007/0262139 A1 | 11/2007 | Fiebiger et al. | |
| 2007/0288247 A1* | 12/2007 | Mackay | G06Q 10/00 705/1.1 |
| 2008/0046366 A1 | 2/2008 | Bemmel et al. | |
| 2008/0155257 A1 | 6/2008 | Werner et al. | |
| 2008/0201212 A1 | 8/2008 | Hammad et al. | |
| 2008/0255993 A1 | 10/2008 | Blinbaum | |
| 2009/0254971 A1 | 10/2009 | Herz et al. | |
| 2011/0191280 A1 | 8/2011 | Takahashi | |
| 2014/0026187 A1* | 1/2014 | Johnson | G06F 21/53 726/3 |
| 2016/0335618 A1* | 11/2016 | Koh | G06Q 20/206 |

FOREIGN PATENT DOCUMENTS

| | | |
|---|---|---|
| WO | 02054804 | 7/2002 |
| WO | 2008027620 | 3/2008 |

OTHER PUBLICATIONS

Examination Report in European Application No. 08746927.6 dated Apr. 9, 2013, 6 pages.

Office Action in Mexican Application No. MX/a/2009/011631 dated Apr. 16, 2013, 4 pages.

Office Action in Mexican Application No. MX/a/2009/011633 dated Apr. 17, 2013, 3 pages.

Patent Examination Report in Australian Application No. 2008245668 dated Aug. 17, 2012, 2 pages.

Office Action in Canadian Application No. 2,685,414 dated May 30, 2012, 5 pages.

Office Action in Mexican Application No. MX/a/2009/011631 dated Jun. 7, 2012, 3 pages.

Office Action in Mexican Application No. MX/a/2009/011633 dated Jun. 8, 2012, 2 pages.

Examination Report in European Application No. 08746398.0 dated Nov. 17, 2011, 4 pages.

Supplemental Search Report in European Application No. 08746926.8 dated Nov. 9, 2011, 7 pages.

Examination Report in Australian Application No. 2008245668 dated Jan. 25, 2012, 2 pages.

Examination Report in Australian Application No. 2008245878 dated Dec. 19, 2011, 3 pages.

Examination Report in Australian Application No. 2008245880 dated Jan. 25, 2012, 2 pages.

Examination Report in Australian Application No. 2008245878 dated Sep. 7, 2011, 2 pages.

Examination Report in Australian Application No. 2008245666 dated Mar. 3, 2011, 9 pages.

Supplementary European Search Report in Application No. 08746927.6 dated Jun. 7, 2011, 4 pages.

Examiner's Second Report in Australian Application No. 2008245878 dated Jun. 20, 2011, 2 pages.

Examination Report in Australian Application No. 2008245878 dated Jan. 18, 2011, 2 pages.

European Search Report in Application No. 08746398.0 dated Mar. 22, 2011, 5 pages.

European Search Report in Application No. 08746400.4 dated Mar. 22, 2011, 5 pages.

Giesecke & Devrient and MasterCard International Launch World's First Over-The-Air Personalization Solution for Mobile Phonebased Payments, Business Wire, New York: Apr. 5, 2006, p. 1.

(56) References Cited

OTHER PUBLICATIONS

Top of Our Radar: Next Generation Mobile Phone with 'Tap & Go(TM)' Payment in New York City, M2 Presswire, Coventry: Dec. 15, 2006, p. 1.

MasterCard and VeriFone Announce First Ever 'Tap & Go(TM)' Payments in Taxis, Business Wire, New York: Nov. 15, 2006, 4 pages.

News Digest: Nokia launches mobile payment NFC handset, Electronic Payments International, London: Jan. 2007, p. 4.

A Cash Call—Smart cards and mobile phones are quickly emerging as ways to pay with electronic cash, The Economist, Feb. 17, 2007, 3 pages.

ViVOtech, Inc., RF-Based Contactless Payment, White Paper, Apr. 2006.

TI-RFid.TM & Contactless Commerce, http://www.ti.com/rfid/shtml/apps-contactless.shtml, unknown publication date, 1 page/ [Retrieved Oct. 11, 2007].

http://www.vivotech.com/, Contactless & NFC Mobile Phone Payments, unknown publication date, 1 page. [Retrieved Oct. 11, 2007].

Office Action in Mexican Application No. MX/a/2009/011630 dated May 7, 2013, 4 pages.

Office Action in Mexican Application No. MX/a/2009/011630 dated Sep. 25, 2012, 4 pages.

International Preliminary Report in Application No. PCT/US2008/060970 dated Oct. 27, 2009, 4 pages.

International Search Report and Written Opinion in Application No. PCT/US2008/060970 dated Aug. 13, 2008, 8 pages.

International Preliminary Report in Application No. PCT/US2008/060972 dated Oct. 27, 2009, 6 pages.

International Preliminary Report in Application No. PCT/US2008/061602 dated Oct. 27, 2009, 7 pages.

International Search Report and Written Opinion in Application No. PCT/US2008/061602 dated Jun. 27, 2008, 7 pages.

International Preliminary Report in Application No. PCT/US2008/061604 dated Oct. 27, 2009, 5 pages.

International Search Report and Written Opinion in Application No. PCT/US2008/060972 dated Aug. 29, 2008, 10 pages.

International Search Report and Written Opinion in Application No. PCT/US2008/061604 dated Jul. 1, 2008, 9 pages.

Office Action in Mexican Application No. MX/a/2009/011631 dated Jan. 18, 2014, 4 pages.

Office Action in Mexican Application No. MX/a/2009/011630 dated Dec. 9, 2013, 6 pages.

John Boyd, "Here comes the Wallet Phone: Japan's DoCoMo gets ready to put your money where your mouth is," IEEE Spectrum, Nov. 2005, pp. 12-14.

William Eazel, "PayPal intros SMS Payments," vnunet.com, Mar. 24, 2006, http://www.vnunet.com/articles/print/2152694, 2 pages. [Retrieved Oct. 24, 2007].

Jerry Gao, et al., "P2-Paid: A Peer-to-Peer Wireless Payment System," Proceedings of the 2005 Second IEEE International Workshop on Mobile Commerce and Services (WMCS'05), 10 pages.

Jerry Gao, et al., "A Wireless Payment System," Proceedings of the Second International Conference on Embedded Software and Systems (ICESS '05), 8 pages.

Amir Herzberg, "Payments and Banking with Mobile Personal Devices," Communications of the ACM, May 2003, vol. 46., No. 5, pp. 53-58.

Mobile banking on the move at last, Retailer Bank International (London ed.), London: Mar. 2006, p. 3.

Alex Ortolani, "Cashing in Where Cash is King; Chinese Cellphone Providers Develop Mobile Payment Systems," Asian Wall Street Journal [Victoria, Hong Kong], Jan. 24, 2005, p. A7.

C. Merrell, "Spanish Steps [mobile payments], " Financial World, Sep. 2003, pp. 21-24, 26.

Ross Snel, "Swedish Bank Starts Offering Services by Cell Phone," American Banker, New York, N.Y, Oct. 11, 1999, vol. 164, Iss. 195, p. 32.

Office Action in Mexican Application No. MX/a/2009/011630 dated Mar. 2012, 2 pages.

\* cited by examiner

PAYMENT APPLICATION DOWNLOAD TO MOBILE PHONE AND PHONE PERSONALIZATION

CROSS-REFERENCE TO RELATED APPLICATIONS

The present application is a continuation of U.S. application Ser. No. 14/086,080, filed Nov. 21, 2013 (now U.S. Pat. No. 9,307,341), which is a continuation of U.S. application Ser. No. 11/741,288 filed Apr. 27, 2007 (now U.S. Pat. No. 8,620,260); the disclosures of each of the above-referenced applications are incorporated by reference herein in their entireties.

BACKGROUND OF THE INVENTION

Field of Invention

The present invention relates generally to mobile payments, and more specifically to installing and operating a payment application on a mobile phone.

Related Art

Mobile or cellular phones can be adapted to be used as payment devices to pay for the purchase of goods and services. As an example, mobile phones can incorporate the express-pay technology found, for instance, in some credit or debit cards, wherein a radio frequency identification (RFID) chip containing a small microcontroller and metal antenna is embedded in the plastic of the card and replaces the traditional authenticating function of a magnetic stripe bearing cardholder information.

A mobile phone user who has a transaction account such as an American Express®, Visa®, MasterCard®, or Discover® account can adapt the phone for use as a payment device in one of several ways currently in development.

For example, the user can visit a secure website in order to request that a payment application and personal account information be transmitted to the user's mobile phone. In this method, the user might provide his or her transaction account number, the telephone number of the user's mobile phone, and verification information (such as personal information or a password) at a computer connected to the Internet. When the provider of the transaction account receives the user's information over the Internet, the provider verifies the information and preferably associates the user's transaction account number with the telephone phone of the user's mobile phone.

Alternatively, the mobile phone user can call a customer service representative of the provider of the transaction account in order to request that a payment application and personal account information be transmitted to the user's mobile phone. In this method, all of the information necessary to complete the request is provided by the user over the telephone.

A third option is for the mobile phone user to fill out a paper form with all of the information associated with a request that a payment application and personal account information be transmitted to the user's mobile phone. The completed paper form is then mailed or personally delivered by the user to the provider of the transaction account.

In each case, after the provider verifies the received information and preferably associates the user's transaction account number with the telephone number of the user's mobile phone, the user is able to download a payment application to the mobile phone and to use the mobile phone as a payment device.

Typical downloading methods can be used, such as by plugging the mobile phone into a computer in which the necessary software has been stored, or which can provide a conduit to an Internet site at which the software is located.

There is room for improvement in the development of methods for converting a mobile phone for use as a payment device. For instance, there are possible difficulties in not being unable to locate or access a computer with an online connection, the time required to download software first to a computer and then from the computer to a mobile phone, the time delay associated with mailing and processing of a paper request form, and the inconvenience of having to travel to an office of the provider in order to deliver a paper request form. As well, secure personalization of a payment application via an online connection to a host server can be unreliable as a method of downloading necessary data since the connection may drop at any time.

Accordingly, there is a need for fast and reliable way to securely personalize a payment application using a mobile phone in a manner that does not require the establishment of an online connection in order to achieve successful downloads

BRIEF DESCRIPTION OF THE INVENTION

The present invention meets the above-identified need by providing for secure personalization of a device over a wireless network.

The invention provides a method of personalizing a device over a wireless network comprising receiving a request to personalize the device with user-specific information, preparing a unique personalization file, providing a description file to the device over the wireless network, providing the application to the device over the wireless network, and providing the unique personalization file to the device over the wireless network.

The invention also provides a method of configuring a mobile phone to operate as a financial transaction instrument comprising accepting a request to program a user's mobile phone, processing the request, and loading onto the phone financial transaction account information and a program that operates to transmit the account information from a transmitter of the phone to a merchant's reader.

Additionally, the invention further provides a method of configuring a mobile phone to operate as a financial transaction instrument comprising receiving a request from a user to program a mobile phone to operate as a financial transaction instrument, sending a message containing a URL pointing to a web-hosting environment containing an application, and loading onto the phone financial transaction account information and an application for operating the phone as a financial transaction instrument, after the user has contacted the web-hosting environment using the URL.

According to the invention, a mobile phone preferably having the capability of transmitting information to an RFID or other reader is provided with an application that enables the phone to be used as a financial transaction instrument. The enabled phone can be brought within a certain distance from a merchant's RFID reader so as to transmit the user's financial transaction account information to the merchant, in order to purchase goods or services.

An advantage of the present invention is that mobile phone owners can quickly and conveniently adapt their mobile phones into payment devices, thereby reducing or eliminating the need to carry one or more traditional cards such as credit or debit cards in order to pay for goods and services Another advantage of the present invention is a reliable download solution for downloading a payment application and personal information onto a mobile phone.

Further features and advantages of the present invention will become more apparent in view of detailed description of the present invention, taken together with the accompanying drawings, in which the left-most digit of a reference number identifies the drawing in which the reference number first appears.

DETAILED DESCRIPTION

Figure 1:
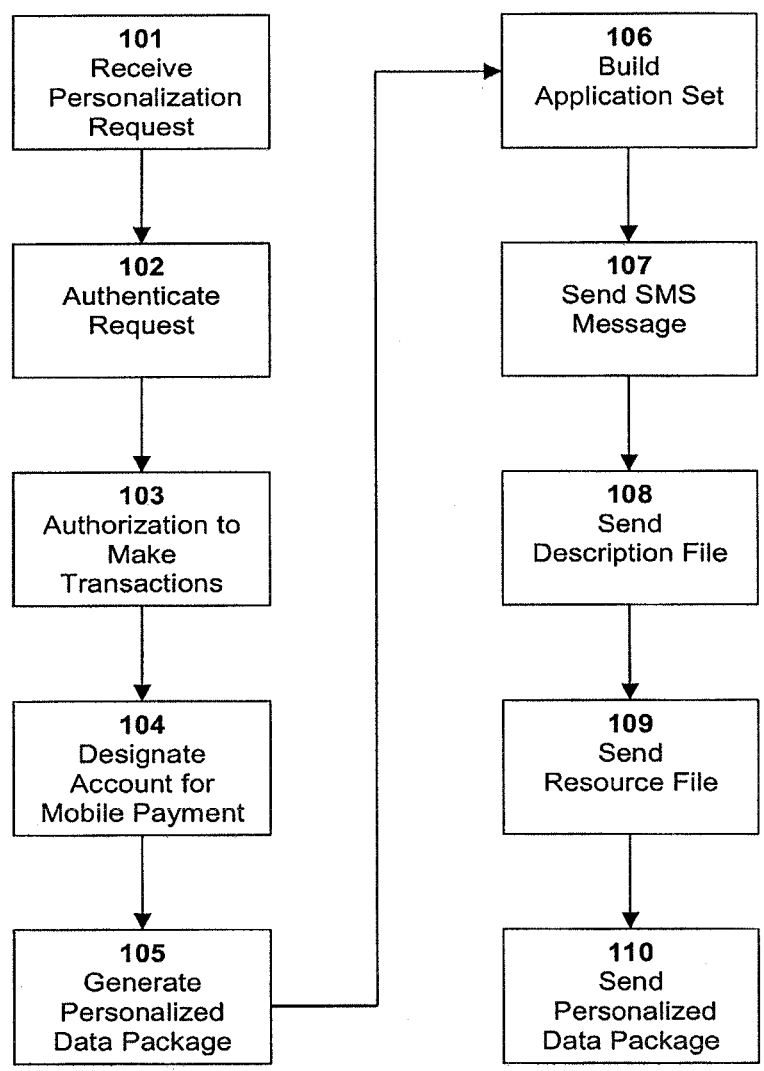
FIG. 1 is a flowchart illustrating a process of personalizing a device over a wireless network according to one embodiment of the present invention.

A "transaction account" as used herein refers to an account associated with an open account or a closed account system, as described below. The transaction account may exist in a physical or non-physical embodiment. For example, a transaction account may be distributed in non-physical embodiments such as an account number, frequent-flyer account, telephone calling account, or the like. Furthermore, a physical embodiment of a transaction account may be distributed as a financial transaction instrument.

A "financial transaction instrument" may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or it may be a fob having a transponder and an RFID reader. A financial transaction instrument with this electronic functionality can be brought within a certain distance from a reader (for example, a merchant's RFID reader) so as to transmit financial transaction account information to the reader (for example, in order to purchase goods or services from the merchant).

"Open cards" are financial transaction cards that are generally accepted at different merchants. Examples of open cards include American Express, Visa®, MasterCard®, and Discover® cards, which may be used at many different retailers and other businesses. In contrast, "closed cards" are financial transaction cards that may be restricted to use in a particular store, a particular chain of stores, or a collection of affiliated stores. One example of a closed card is a pre-paid gift card that may only be purchased at, and only be accepted at, a clothing retailer, such as The Gap® store.

Stored value cards are forms of transaction instruments associated with transaction accounts, wherein the stored value cards provide cash equivalent value that may be used within an existing payment/transaction infrastructure. Stored value cards are frequently referred to as gift, pre-paid, or cash cards, in that money is deposited in the account associated with the card before use of the card is allowed. For example, if a customer deposits ten dollars of value into the account associated with the stored value card, the card may only be used for payments up to ten dollars. The present invention encompasses configuring a mobile phone or other mobile device to be used as a stored value card.

With regard to use of a transaction account, users may communicate with merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit implemented in the form of a computer-server, although other implementations are possible.

In general, transaction accounts may be used for transactions between the user and merchant through any suitable communication device, such as the following: a telephone network; an intranet; the global, public Internet; a point of interaction device (e.g., a point of sale (POS) device, personal digital assistant (PDA), mobile phone, kiosk, etc.); online communications; off-line communications; wireless communications; and/or the like.

An "account," "account number," or "account code", as used herein, may include any device, code, number, letter, symbol, digital certificate, smart chip, digital signal, analog signal, biometric, or other identifier/indicia suitably configured to allow a consumer to access, interact with, or communicate with a financial transaction system. The account number may optionally be located on or associated with any financial transaction instrument (e.g., a rewards, charge, credit, debit, prepaid, telephone, embossed, smart, magnetic stripe, bar code, transponder, or radio frequency card).

The account number may be distributed and stored in any form of plastic, electronic, magnetic, radio frequency (RF), wireless, audio, and/or optical device capable of transmitting or downloading data from itself to a second device. A customer account number may be, for example, a sixteen-digit credit card number. Each credit card issuer has its own numbering system, such as the fifteen-digit numbering system used by American Express Company of New York, N.Y. Each issuer's credit card numbers comply with that company's standardized format such that an issuer using a sixteen-digit format will generally use four spaced sets of numbers in the form of:

$N_1 N_2 N_3 N_4\ N_5 N_6 N_7 N_8\ N_9 N_{10} N_{11} N_{12}\ N_{13} N_{14} N_{15} N_{16}$

The first five to seven digits are reserved for processing purposes and identify the issuing institution, card type, and so on. In this example, the last (sixteenth) digit is typically used as a sum check for the sixteen-digit number. The intermediary eight-to-ten digits are used to uniquely identify the customer, cardholder, or card member.

A merchant account number may be, for example, any number or alpha-numeric characters that identify a particular merchant for purposes of card acceptance, account reconciliation, reporting, and the like.

The terms "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an online merchant or the like.

"Personalizing" refers to enabling a device with an application including user-specific information.

Figure 2:
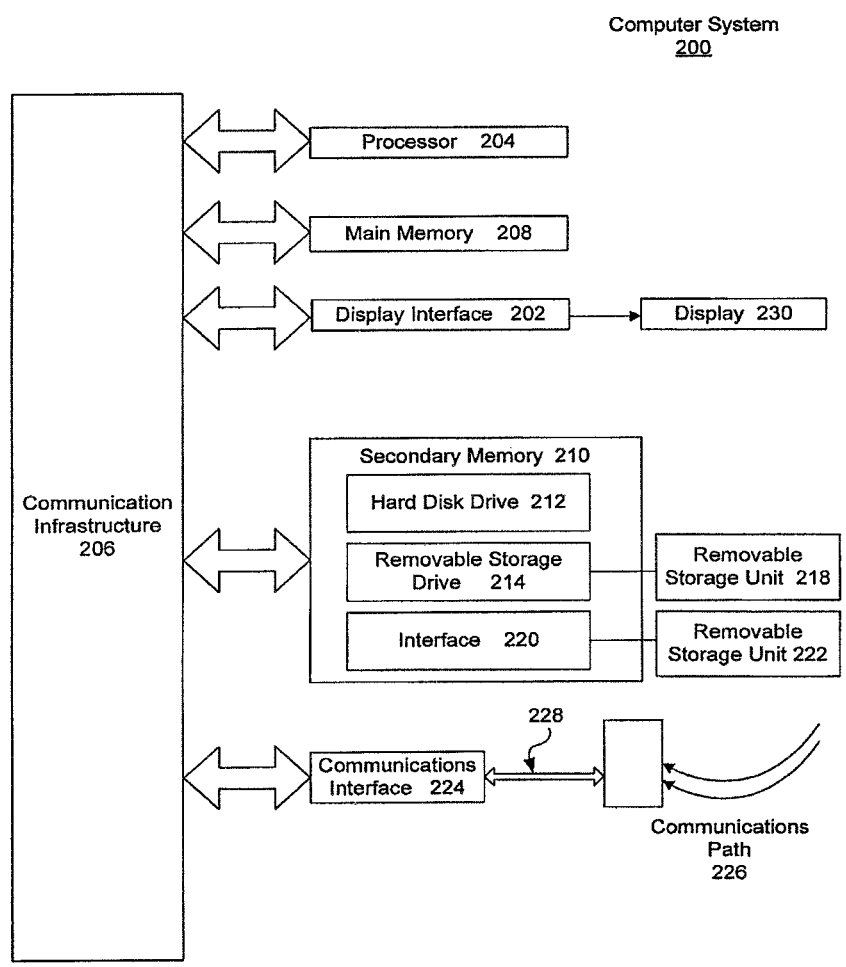
FIG. 2 shows a computer system employed in the process of personalizing a device over a wireless network according to one embodiment of the present invention.

An example of a computer system 200 employed in the process of personalizing a device over a wireless network is shown in FIG. 2.

The computer system 200 includes one or more processors, such as processor 204. The processor 204 is connected to a communication infrastructure 206 (e.g., a communications bus, cross-over bar, or network). After reading this description, it will become apparent to a person skilled in the relevant art(s) how to implement the invention using other computer systems and/or architectures.

Computer system 200 can include a display interface 202 that forwards graphics, text, and other data from the communication infrastructure 206 (or from a frame buffer not shown) for display on the display unit 230.

Computer system 200 also includes a main memory 208, preferably random access memory (RAM), and may also include a secondary memory 210. The secondary memory 210 may include, for example, a hard disk drive 212 and/or a removable storage drive 214, representing a floppy disk drive, a magnetic tape drive, an optical disk drive, and so on. The removable storage drive 214 reads from and/or writes to a removable storage unit 218 in a well-known manner. Removable storage unit 218 represents a floppy disk, magnetic tape, optical disk, and so on, which is read by and written to by removable storage drive 214. As will be appreciated, the removable storage unit 218 includes a computer usable storage medium having stored therein computer software and/or data.

In alternative embodiments, secondary memory 210 may include other similar devices for allowing computer programs or other instructions to be loaded into computer system 200. Such devices may include, for example, a removable storage unit 222 and an interface 220. Examples of such may include a program cartridge and cartridge interface (such as that found in video game devices), a removable memory chip (such as an erasable programmable read only memory (EPROM), or programmable read only memory (PROM)) and associated socket, and other removable storage units 222 and interfaces 220, which allow software and data to be transferred from the removable storage unit 222 to computer system 200.

Computer system 200 may also include a communications interface 224. Communications interface 224 allows software and data to be transferred between computer system 200 and external devices. Examples of communications interface N24 may include a modem, a network interface (such as an Ethernet card), a communications port, a Personal Computer Memory Card International Association (PCMCIA) slot and card, and so on. Software and data transferred via communications interface 224 are in the form of signals 228 which may be electronic, electromagnetic, optical, or other signals capable of being received by communications interface 224. These signals 228 are provided to communications interface 224 via a communications path (e.g., channel) 226. This channel 226 carries signals 228 and may be implemented using wire or cable, fiber optics, a telephone line, a cellular link, a radio frequency (RF) link, and other communications channels.

In this document, the terms "computer program medium" and "computer usable medium" are used to generally refer to media such as removable storage drive 214, a hard disk installed in hard disk drive 212, and signals 228. These computer program products provide software to computer system 200.

Computer programs (also referred to as computer control logic) are stored in main memory 208 and/or secondary memory 210. Computer programs may also be received via communications interface 224. Such computer programs, when executed, enable the computer system 200 to perform the features of the present invention, as discussed herein. In particular, the computer programs, when executed, enable the processor 204 to perform the features of the present invention. Accordingly, such computer programs represent controllers of the computer system 200.

In an embodiment where the invention is implemented using software, the software may be stored in a computer program product and loaded into computer system 200 using removable storage drive 214, hard drive 212, or communications interface 224. The control logic (software), when executed by the processor 204, causes the processor 204 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Figure 3:
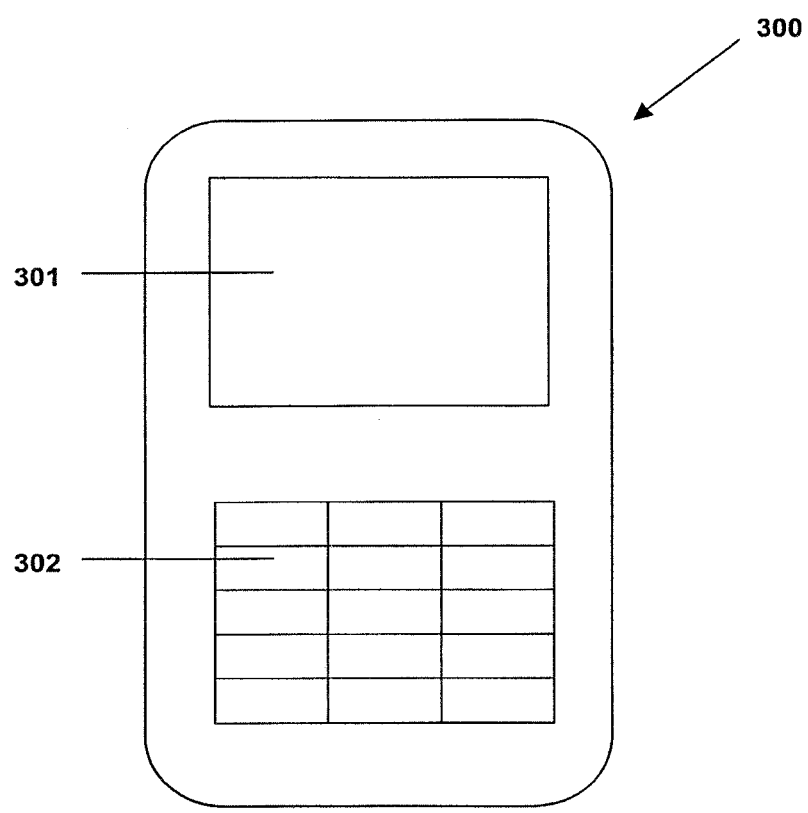
FIG. 3 schematically shows the front side of a typical mobile phone.
Figure 4:
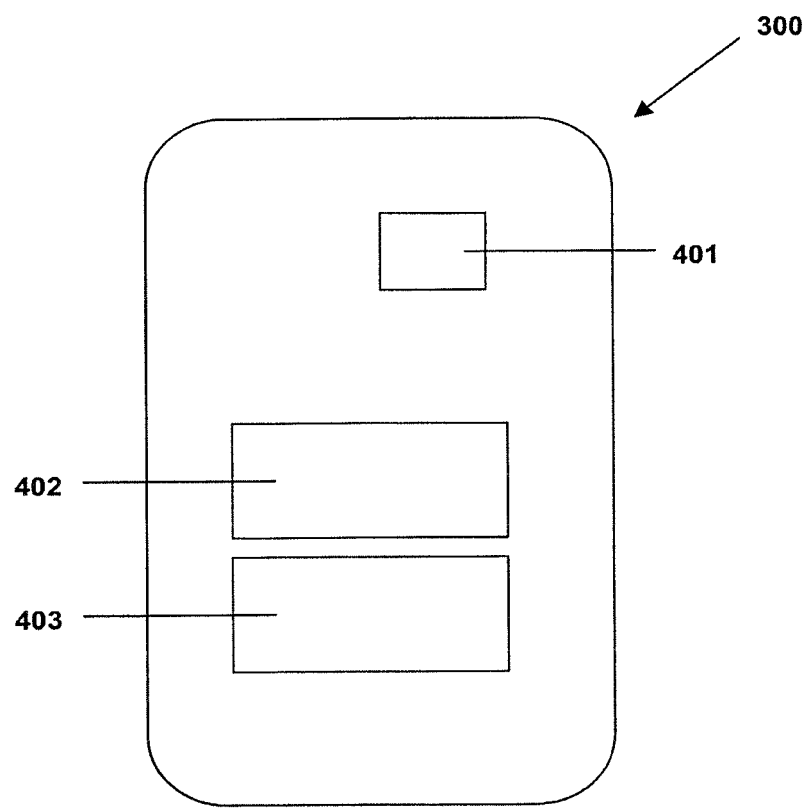
FIG. 4 schematically shows selected components inside the mobile phone of FIG. 3.

FIG. 3 shows the front side of a typical mobile phone 300 with a display screen 301 and a keypad 302. As shown in FIG. 4, which depicts selected components inside the mobile phone 300, the mobile phone 300 includes at least one transmitter (or transceiver) 401, a processing block 402, and a memory block 403. As would be understood by one of skill in the art in light of the present description, the mobile phone 300 can communicate with the computer system 200, for example, over a wireless network.

Typically, in order to be operated as a financial transaction instrument, the user's mobile phone 300 is provided, within the processing block 402, with an application programming interface, such as Java 2 Micro Edition (J2ME), as well as a secure element provided with a smart card operating system such as Java Card OpenPlatform (JCOP). JCOP has a Java Virtual Machine (JVM), which allows the running of applications written in Java programming language. Other operating systems or platforms, secure elements, and programming languages may be employed. The mobile phone 300 is typically also provided with a transmitter (or a transceiver) 401 with electronic functionality, which can be used to transmit information to a reader, such as a financial transaction instrument reader belonging to a merchant. (If the phone is provided with a transceiver, it can receive as well as transmit information.) Thus, the phone can be converted into a payment device that can take the place of a traditional credit card or the like. In other embodiments, the phone may have some other mechanism for providing information to an instrument reader (for example, physical connection means, light, and so on).

Also, as would be understood by one of ordinary skill in the art in light of the present application, the present invention is not limited to mobile phones. Other mobile devices, such as personal digital assistants, can also be securely personalized over a wireless network and used as a payment device.

With reference to FIG. 1, the process of adapting a mobile phone or other mobile device for use as a payment device will now be described. (In the following description, the mobile phone being referred to may be the mobile phone 300 shown in FIGS. 3 and 4, and the events occurring at a provider's side may be implemented using the computer system 200 shown in FIG. 2.) The provider of a transaction account owned by a mobile phone user receives a request (101) from the user to personalize the mobile phone with user-specific information associated with the transaction account. This request may be made, for example, by sending a message from the mobile phone by Short Message Service (SMS). Other wireless methods, such as Multimedia Messaging Service, may be employed for sending the request. Typically, the request includes the account number associated with the transaction account. The request may include other information such as the name of the account owner, a username, and a password. The user may also send the request by visiting a website of the provider through a computer terminal or by visiting the website through the mobile phone. The request is received at the provider's side at, for example, a host server, and is authenticated (102) at the provider's side. (Alternatively, a third party "over-the-air" service could perform the authentication on behalf of the provider.) Authentication means establishing the identity of the mobile phone user, and specifically, establishing that the user is the owner of the transaction account. The request is then authorized at the provider's side (103). Authorization means allowing the owner of the transaction account (that is, the mobile phone user) to interact with the transaction account using the mobile phone.

Following authorization (103), the transaction account is designated at the provider's end as permitting mobile payment (104), that is, the provider preferably establishes a record of the authorization of the owner to interact with the transaction account through the mobile phone. In addition, a personalized data package, which includes user-specific information that is unique to the owner of the transaction account, is generated (105) at the provider's end. This is information for installation into the mobile phone to enable its use as a financial transaction instrument. An application set is built (106) based on that information. The application set includes a description file (described below) to be downloaded to a mobile device; it also includes the personalized data package generated in step 105.

It will be appreciated by one of ordinary skill in the art, in light of the present application, that steps 101 through 106 can be fully automated at the provider's side (using hardware and/or software such as one or more computer systems or other processing systems running software programs), or they can incorporate human input (for example, a person at the provider's side can check a database to con firm that a transaction account for the user does exist).

Previously, there has been a need to plug a mobile phone into a computer in order to download information to enable the phone to function as a mobile payment device. In contrast, the present invention provides a method of personalizing a mobile device in which software and personalized data are provided to the device over a wireless network. Preferably, SMS messages are employed in carrying out the method of the invention, but other forms of wireless communication may also be used. Generally speaking, SMS messages may directly contain information for enabling the phone as a payment device, or the SMS messages may contain instructions for how to obtain such information.

From the provider's side, an SMS message is sent to the mobile phone of the user (107), either completely automatically or with input from a person. (Other wireless methods, such as Multimedia Messaging Service, may be employed in place of SMS.) The SMS message preferably informs the user that the necessary application(s) are ready for download to the phone. The SMS message also preferably includes a Uniform Resource Locator (URL) address that points to a description file, such as a Java application descriptor file (.JAD file), which is hosted at the provider's side in a web-hosting environment and may be specific to the user. When the user visits the URL, the description file, which is part of the application set built in step 106, may be downloaded (108). This preferably occurs automatically when the user contacts the web-hosting environment. The .JAD file preferably contains another URL leading to a resource file, such as a Java archive file (.JAR file), which is hosted at the provider's side in a web-hosting environment, and that comprises software that will perform as a payment application (further described later) once installed on the mobile phone. The .JAD file also preferably contains instructions on how to obtain the personalized data package generated in step 105 (for example, the .JAD can provide an URL leading to the personalized data package generated in step 105). Preferably, when the .JAD file is read by the mobile phone for the first time, the URL to the resource file is submitted, thereby causing the downloading of the resource file (109) to the mobile phone, where it is to be executed in the main operating environment of the phone. The main operating system of the phone, which is J2ME in this embodiment, functions to control the keypad of the phone, the display screen, and so on.

If the user chooses to execute the .JAR file and run the included software in the main operating environment, then the personalized data package generated in step 105 is sent to the mobile phone (110). (This can occur, for example, through accessing a personalized data package URL in the .JAD file.) The downloaded personalized data package is initially stored in a main memory of the phone associated with the main operating environment. The personalized data package includes a unique personalization file containing information specific to the owner of the transaction account. Internal logic in the executed .JAR file and the phone's application programming interface (J2ME) work together to implement the personalized data package onto the phone by pushing the personalized data package into a secure element of the phone. The secure element is generally a module that is resistant to improper physical and electronic tampering, and thus is suitable for storing sensitive information. In this embodiment, the secure element is a tamper resistant module that conforms to Federal Information Processing Standard (FIPS) 140-2. More specifically, in this embodiment, the secure element is a secure card that uses the JCOP operating system. With the implementation of the personalized data package, the secure element in the phone has been personalized with the financial transaction account information. (Preferably, the executed .JAR file then deletes the personalized data package from the main memory of the phone as a precaution against unwanted access to the data package should the phone be lost.)

Instead of having the description file contain instructions on how to obtain the personalized data package (which includes the unique personalization file containing information specific to the owner of the transaction account), the description file can directly contain the information specific to the owner of the transaction account. In this case, if the user chooses to execute the .JAR file, the information specific to the owner of the transaction account is accessed from the .JAD file and implemented onto the phone, into the secure element.

The downloaded software, once installed on the mobile phone, performs as a payment application. Specifically, the software provides the phone with functionality to transmit financial transaction account information using a transmitter, allows the user to operate the financial transaction account system on the phone, and allows for wireless communication between the phone and the provider. That is, the mobile phone, having been provided with a payment application, is configured to operate as a financial transaction instrument and can be used as a payment device. The mobile phone can now be operated to transmit financial transaction account information of the user (such as the information downloaded in step 110) from the mobile phone to a reader such as a merchant's financial transaction instrument reader. Thus, the mobile phone user does not need to carry a traditional financial transaction instrument, such as a credit card, in order to be able to purchase goods and services. One example of a payment application is the ExpressPay® Java application from American Express Company.

The above-described process from steps 101 to 110 can be repeated for a plurality of financial transaction accounts, such that the mobile phone can be used in placed of multiple financial transaction instruments. In this way, the mobile phone user can avoid the need to carry numerous traditional cards in order to purchase a variety of goods and services from different types of merchants.

Use of the mobile phone as a payment device is described in further detail in the above-identified related application, User Experience on Mobile Phone.

According to the present invention, there is no need to plug (or otherwise physically connect) a mobile phone into a computer in order to enable the phone to function as a mobile payment device. The downloading of the description file (108), the downloading of the resource file (109), and the downloading of the personalized data package (110) preferably all occur over a wireless network. Further, secure personalization is fast. For example, the process from the user's receipt of the SMS message (sent in step 107) to complete download of the personalized data package (sent in step 110) onto the user's mobile phone may take about a minute. Moreover, the URL in the SMS message is easy for a user to use, and the user is able to make as little as a single "click" (on the URL in the SMS message) in order to enable a mobile phone to function as a mobile payment device. As well, secure personalization of a payment application according to the present invention does not rely on an online connection to a host server, avoiding problems such as incomplete downloads due to dropped connections.

While an embodiment of the present invention has been described above, it should be understood that it has been presented by way of example, and not by way of limitation. It will be apparent to persons skilled in the relevant art(s) that various changes in form and detail can be made therein without departing from the spirit and scope of the present invention. The present invention should be defined only in accordance with the following claims and their equivalents.

Further, the purpose of the Abstract is to enable the U.S. Patent and Trademark Office and the general public, who may not be familiar with patent or legal terms, to quickly determine the nature and essence of the technical disclosure of the application. The Abstract is not intended to limit the scope of the present invention in any way. It is also to be understood that the steps and processes recited in the claims need not be performed in the order presented.

The invention claimed is:

1. A method of configuring a user device as a mobile financial transaction instrument, comprising:

receiving, by the user device, a text message from a provider of a transaction account that is associated with a user of the user device, wherein the text message indicates that a resource file comprising a software module to be installed on the user device is ready for download at a Uniform Resource Locator (URL) indicated in the text message, wherein the received text message is responsive to a request to personalize the user device;

in response to accessing the URL, the user device receiving the resource file and installing the software module in a memory of the user device;

in response to transmitting information indicating the user device has accessed the software module, the user device receiving a personalized data package, wherein the personalized data package includes transaction account information associated with the user and the transaction account;

storing, by the user device, the personalized data package in the memory;

based on instructions in the resource file, the user device executing the personalized data package and after executing, deleting the personalized data package from the memory; and transmitting, by the user device via radio frequency (RF), the transaction account information to a point of sale device (POS).

2. The method of claim 1, wherein executing the personalized data package comprises copying the personalized data package to a second, secure memory element that is a secure card using a Java Card OpenPlatform (JCOP) operating system.

3. The method of claim 1, wherein the software module is configured to cause the user device, based upon the personalized data package, to operate as the mobile financial transaction instrument.

4. The method of claim 1, wherein the text message includes a description file comprising the URL.

5. The method of claim 1, wherein the request to personalize the user device includes an authentication request to retrieve the resource file.

6. The method of claim 1, wherein the text message includes information regarding downloading the software module to the user device.

7. The method of claim 1, wherein the resource file is based on the personalized data package.

8. The method of claim 1, wherein the resource file is a Java archive file.

9. The method of claim 1, wherein the user device is a mobile phone.

10. A user device, comprising:

a processor;

a memory coupled to the processor; and a second, secure memory coupled to the processor;

wherein the memory has stored thereon instructions executable to cause the user device to perform operations comprising:

receiving a text message from a provider of a transaction account that is associated with a user of the user device, wherein the text message indicates that a resource file comprising a software module to be installed in the memory of the user device is ready for download at a Uniform Resource Locator (URL) indicated in the text message, wherein the received text message is responsive to a request to personalize the user device;

in response to accessing the URL, receiving the resource file and installing the software module in the memory of the user device;

in response to transmitting information indicating the user device has accessed the software module, receiving a personalized data package, wherein the personalized data package includes transaction account information associated with the user and the transaction account;

storing the personalized data package in the memory;

based on instructions included in the resource file, executing the personalized data package and after executing, deleting the personalized data package from the memory; and transmitting, via radio frequency (RF), the transaction account information to a point of sale device (POS).

11. The user device of claim 10, wherein the operations further comprise accessing the personalized data package via the software module.

12. The user device of claim 10, wherein the operations further comprise conducting a transaction via the transaction account.

13. The user device of claim 10, wherein the user device is a mobile phone.

14. A non-transitory computer-readable medium having stored thereon instructions executable by a user device to cause the user device to perform operations comprising:

receiving a text message from a provider of a transaction account that is associated with a user of the user device, wherein the text message indicates that a resource file comprising a software module to be installed on the user device is ready for download at a Uniform Resource Locator (URL) indicated in the text message, wherein the received text message is responsive to a request to personalize the user device;

in response to accessing the URL, receiving the resource file and installing the software module in a memory of the user device;

in response to transmitting information indicating the user device has accessed the software module, receiving a personalized data package, wherein the personalized data package includes transaction account information associated with the user and the transaction account;

storing the personalized data package in the memory;

based on instructions included in the resource file, executing the personalized data package and after executing, deleting the personalized data package from the memory; and transmitting, via radio frequency (RF), the transaction account information to a point of sale device (POS).

15. The non-transitory computer-readable medium of claim 14, wherein the operations further comprise performing a transaction via the software module.

16. The non-transitory computer-readable medium of claim 14, wherein the operations further comprise accessing the personalized data package via the software module.

17. The non-transitory computer-readable medium of claim 14, wherein the operations further comprise receiving information indicating that the user device has been authenticated.

* * * * *